United States Patent
Gopisetty et al.

(10) Patent No.: US 10,203,993 B2
(45) Date of Patent: Feb. 12, 2019

(54) METHOD AND SYSTEM FOR CONTINUOUS OPTIMIZATION OF DATA CENTERS BY COMBINING SERVER AND STORAGE VIRTUALIZATION

(75) Inventors: Sandeep Gopisetty, Morgan Hill, CA (US); Madhukar R. Korupolu, Sunnyvale, CA (US); Dushmanta Mohapatra, Atlanta, GA (US); Seshashayee Sankarshana Murthy, Yorktown Heights, NY (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 2090 days.

(21) Appl. No.: 12/388,404

(22) Filed: Feb. 18, 2009

(65) Prior Publication Data

US 2010/0211956 A1    Aug. 19, 2010

(51) Int. Cl.
*G06F 9/50*    (2006.01)

(52) U.S. Cl.
CPC ............ *G06F 9/5088* (2013.01); *G06F 9/505* (2013.01)

(58) Field of Classification Search
CPC .......................... G06F 2009/4557; G06F 9/505
USPC .................................................. 718/104, 105
See application file for complete search history.

(56) References Cited

U.S. PATENT DOCUMENTS

| | | | | |
|---|---|---|---|---|
| 7,203,944 | B1 * | 4/2007 | van Rietschote | G06F 9/45533 718/1 |
| 7,657,659 | B1 * | 2/2010 | Lambeth | G06F 9/45558 370/471 |
| 7,774,444 | B1 * | 8/2010 | George | H04L 41/145 709/217 |
| 7,814,495 | B1 * | 10/2010 | Lim | G06F 9/45558 717/168 |
| 7,962,647 | B2 * | 6/2011 | Suri | H04L 45/00 709/224 |
| 8,019,861 | B2 * | 9/2011 | Ginzton | G06F 9/4856 709/223 |
| 8,037,280 | B2 * | 10/2011 | Pandey et al. | 711/206 |
| 8,060,875 | B1 * | 11/2011 | Lambeth | G06F 9/5077 709/223 |

(Continued)

OTHER PUBLICATIONS

Wikipedia, "Storage Virtualization" article. Jan. 30, 2009. 11 pages.*

(Continued)

*Primary Examiner* — Jacob Petranek
(74) *Attorney, Agent, or Firm* — Sherman IP LLP; Kenneth L. Sherman; Hemavathy Perumal

(57) ABSTRACT

The invention provides a method and system for continuous optimization of a data center. The method includes monitoring loads of storage modules, server modules and switch modules in the data center, detecting an overload condition upon a load exceeding a load threshold, combining server and storage virtualization to address storage overloads by planning allocation migration between the storage modules, to address server overloads by planning allocation migration between the server modules, to address switch overloads by planning allocation migration mix between server modules and storage modules for overload reduction, and orchestrating the planned allocation migration to reduce the overload condition in the data center.

20 Claims, 5 Drawing Sheets

(56) References Cited

U.S. PATENT DOCUMENTS

| | | | |
|---|---|---|---|
| 8,095,929 B1 * | 1/2012 | Ji | G06F 9/4856 709/223 |
| 8,385,202 B2 * | 2/2013 | Kuik | H04L 47/10 370/235 |
| 8,612,559 B2 * | 12/2013 | Kuik | H04L 12/4641 709/221 |
| 8,868,675 B2 * | 10/2014 | Srinivasan | G06F 9/5077 709/201 |
| 2003/0028624 A1 | 2/2003 | Hasan et al. | |
| 2007/0043860 A1 | 2/2007 | Pabari | |
| 2007/0260723 A1 | 11/2007 | Cohen et al. | |
| 2008/0222375 A1 * | 9/2008 | Kotsovinos et al. | 711/162 |

OTHER PUBLICATIONS

VMware Infrastructure: Resource management with VMware DRS. VMware Whitepaper, Nov. 2006, pp. 2-24.

Wood, Timothy et al. Black-box and Gray-box Strategies for Virtual Machine Migration. Symposium on Networked Systems Design and Implementation (NSDI), Mar. 2007, pp. 229-242.

Grit, Laura et al. Virtual machine hosting for networked clusters: Building the foundations for "autonomic" orchestration. Second International Workshop on Virtualization Technology in Distributed Computing, Nov. 2006, pp. 1-8.

IBM SAN Volume Controller (SVC):Essential Technology for a Simpler IT Infrastructure, IBM Oct. 2008, pp. 1-8.

EMC Invista: Making Virtual Storage a Reality for your Enterprise, http://www.emc.com/products/software/invista/invista.jsp, Jul. 2007.

Brinkmann, Andre et al. V:drive—costs and benefits of an out-of-band storage virtualization system. 12th NASA Goddard, 21st IEEE Conference on Mass Storage Systems and Technologies (MSST), Apr. 2004, pp. 153-157.

Huang, Lan et al. "Multidimensional storage virtualization". SIGMETRICS/Performance '04: Joint international conference on measurement and modeling of computer systems, Jun. 2004, pp. 14-24.

Lumb, Christopher R. et al. "Facade: virtual storage devices with performance guarantees". Second USENIX Conference on File and Storage Technologies, pp. 131-144, Mar. 2003.

Lu, C. et al. Acqueduct: Online Data Migration with Performance Guarantees. USENIX Conference on File and Storage Technologies, Jan. 2002, pp. 219-230.

Anderson, E. et al. An experimental study of data migration algorithms. International Workshop on Algorithm Engineering, pp. 145-158, Aug. 2001.

Kallahalla, Mahesh et al. SoftUDC: A software based data center for utility computing. IEEE Computer, pp. 38-46, vol. 37, Issue 11, Nov. 2004.

Warfield, Andrew et al. Parallax: managing storage for a million machines. Proceedings of the 10th conference on Hot Topics in Operating Systems, pp. 4-4, vol. 10, Jun. 2005.

Cisco. Data Center Virtualization and Orchestration: Business and Financial Justification, Jul. 2007, located at http://www.cisco.com/en/US/prod/collateral/netmgtsw/ps6505/ps8463/prod_white_paper0900aecd8068edfc.pdf.

* cited by examiner

METHOD AND SYSTEM FOR CONTINUOUS OPTIMIZATION OF DATA CENTERS BY COMBINING SERVER AND STORAGE VIRTUALIZATION

BACKGROUND OF THE INVENTION

Field of the Invention

The present invention relates generally to data centers, and in particular to continuous optimization of data centers by combining server virtualization and storage virtualization.

Background Information

Modern enterprise data centers are complex distributed environments that are built incrementally over time to satisfy application requirements. Most often configuration decisions, like which host to choose to run an application or which storage to use for application data, are predominantly dictated by the application requirements at the time of its provisioning. However, as application data needs to change over time, it becomes a challenging task for administrators to optimize the data center configuration to store these new requirements. Such optimizations may require migrating an application and data to a new server, migrating storage to a different controllers or re-assigning I/O paths between servers and storage devices.

Traditionally such reconfigurations have been extremely disruptive as both applications and their data are tightly coupled with the physical resources. Making any change at the physical resource level included shutting down or at least quiescing the application and restarting it after reconfiguration. This discourages administrators from performing any reconfiguration optimizations and eventually leads to over-provisioning that further worsens with time.

SUMMARY OF THE INVENTION

The invention provides a method and system for continuous optimization of a data center. The method includes monitoring loads of storage modules, server modules and switch modules in the data center, detecting an overload condition upon a load exceeding a load threshold, combining server and storage virtualization to address storage overloads by planning allocation migration between the storage modules, to address server overloads by planning allocation migration between the server modules, to address switch overloads by planning allocation migration mix between server modules and storage modules for overload reduction, and orchestrating the planned allocation migration to reduce the overload condition in the data center.

Another embodiment of the invention provides a data center system. The data center system includes a plurality of server modules including a plurality of virtual machines, a plurality of storage modules including a plurality of virtual storage modules, a plurality of server module switches configured to switch connections to the plurality of storage modules and virtual storage modules, a monitoring module configured to monitor system loads of the plurality of server modules, the plurality of virtual storage modules, the plurality of storage modules, and the plurality of server module switches, a detection module configured to detect an overload condition upon a system load exceeding a load threshold, a planning module configured to create allocation migration plans between the plurality of server modules, the plurality of virtual server modules, the plurality of storage modules, the plurality of virtual storage modules, and the plurality of server module switches for maximizing load reduction, and a virtualization orchestration module configured to allocate migration according to one or more allocation migration plans to balance system loads.

Yet another embodiment of the invention provides a computer program product that causes a computer to provide managing system loads in a data center comprising a computer usable medium including a computer readable program, wherein the computer readable program when executed on a computer causes the computer to: monitor loads of storage modules, server modules and switch modules in the data center, detect an overload condition upon a load exceeding a load threshold, combine server and storage virtualization to address storage overloads by planning allocation migration between the storage modules, to address server overloads by planning allocation migration between the server modules, to address switch overloads by planning allocation migration mix between server modules and storage modules for overload reduction, and orchestrate the planned allocation migration to reduce the overload condition in the data center.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for continuous optimization of a data center, as well as operation and/or component parts thereof. While the following description will be described in terms of backup/archive processes and devices for clarity and to place the invention in context, it should be kept in mind that the teachings herein may have broad application to all types of systems, devices and applications.

The invention provides a method and system for continuous optimization of a data center. One embodiment involves monitoring loads of storage modules, server modules and switch modules in the data center, detecting an overload condition upon a load exceeding a load threshold, combining server and storage virtualization to address storage overloads by planning allocation migration between the storage modules, to address server overloads by planning allocation migration between the server modules, to address switch overloads by planning allocation migration mix between server modules and storage modules for overload reduction, and orchestrating the planned allocation migration to reduce the overload condition in the data center.

Figure 1:
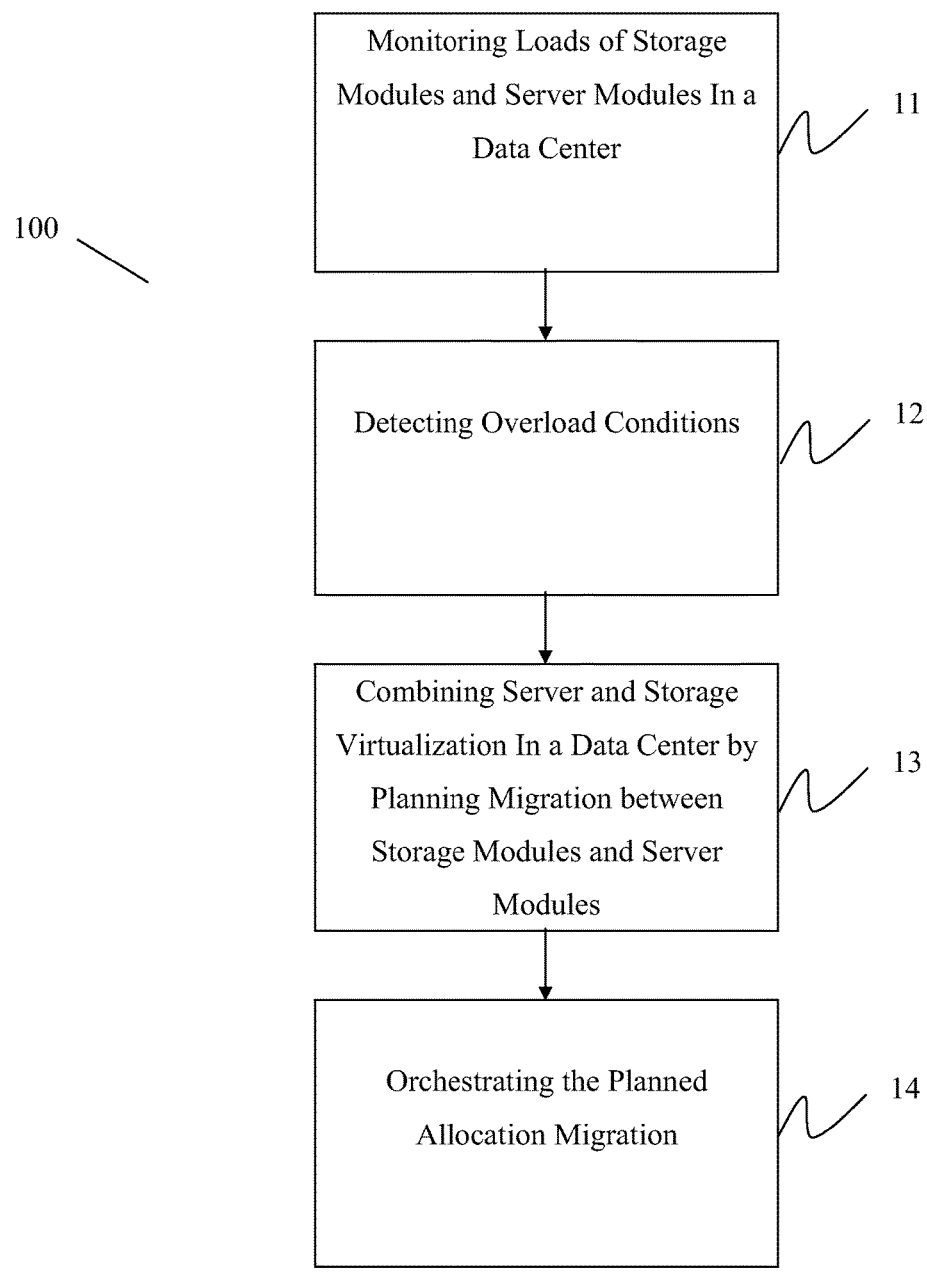
FIG. 1 illustrates a block diagram of a combined server and storage virtualization process of an embodiment of the invention.

FIG. 1 illustrates a block diagram of a combined server and storage virtualization continuous optimization process 100 for a data center of an embodiment of the invention. In block 11 process 100 monitors various loads within the data center. These loads are, for example, switch loads, server loads, CPU usage loads, etc. These loads are based on device usage.

In block 12, process 100 detects overload conditions. In one embodiment of the invention, the overload conditions are predetermined usage thresholds. For example, CPU usage threshold of 80% of its maximum load can be set as an overload condition trigger. In other embodiments, the threshold can be based on heuristics. In one embodiment of the invention, an end-to-end view of the data center is generated for obtaining server and storage management data and server and storage virtualization data. The obtained data is then correlated so that optimized load balances can be determined. Once the optimized load balances are determined, overload triggers can be set according to one embodiment of the invention.

In block 13, server and storage virtualization are combined. In one embodiment, planning is performed with a goal of finding suitable virtual machine or storage migrations that optimize the data center based on the type of generated overload trigger. In one embodiment of the invention, existing server and storage layer optimizations are leveraged and used as black-box optimizations. In one embodiment of the invention, continuous optimization gives hints to each layer of the data center, e.g. for a switch overload: hint to server optimization tool, e.g., move load from Servers A and B to Server C or D; hint to storage optimization tool, e.g., move I/O load from Storage U to Storage X or Y.

In another embodiment of the invention, selection and combination of recommendations are performed. In one embodiment, recommendations that make the most impact on load balancing in the data center are selected. In another embodiment, recommendations from each layer in the data center are combined.

In block 14, the planned allocation migration is orchestrated according to an embodiment of the invention. In one embodiment of the invention, migrations are orchestrated using server and storage virtualization management tools for custom or standards based communication. In one embodiment of the invention, orchestration requires: initial configuration of zoning storage subsystems with storage volume controller (SVC), logical unit number (LUN) mapping physical volumes to SVC, zoning SVC with a physical server, and LUN mapping virtual disks (vdisks) to physical servers.

In one embodiment of the invention, in process 100 continuous optimization planning is performed. In this embodiment, when a server overload is triggered the server optimization layer is called to balance loads (all virtual machines (VM) are candidates), and multiple plans are determined, where each plan may consist of multiple migrations. In one embodiment of the invention, when a storage overload is triggered, the storage optimization layer is called.

In one embodiment of the invention, when a switch overload is triggered, possible server and storage optimizations include: VMs performing I/O through an overloaded switch are candidates for migration, servers not performing I/O through an overloaded switch are candidate destinations.

In one embodiment of the invention, continuous optimization planning includes selecting and combining recommendations for orchestration. In this embodiment, when a server or storage overload is triggered, plans causing switch overload are eliminated and the remaining highest ranked plan is selected. According to another embodiment of the invention, when a switch overload is triggered, plans are combined such that sum of the removed loads exceed the overload amount on the switch that triggered the overload (and no new overload is caused).

For example: Plan-1 is recommended for a server overload trigger and recommends migrating VM1 to Server2, and migrating VM2 to Server3. For plan 1, the load removed=W units. Plan-2 is recommended for a server overload trigger and recommends migrating VM1 to Server4. For plan 2, the load removed=X units. Plan 3 is recommended for a storage overload trigger and recommends migrating Volume (Vol) 1 to storage unit (STG) 4. For plan 3, the load removed=Y units. Plan 4 is recommended for a storage overload trigger and recommends migrate Vol5 to STG-3. For plan 4, the load removed=Z units. For this example, Plan-1 and Plan-4 can be combined if W+Z≥to the overload. In one embodiment of the invention, the continuous selecting and combining for optimization is based on a cost-benefit analysis (e.g., VM moves are preferred over data moves as the cost of storage and the time involved, system resources, etc. is less). In another embodiment of the invention, smaller data movements are preferred over larger data movements.

Figure 2:
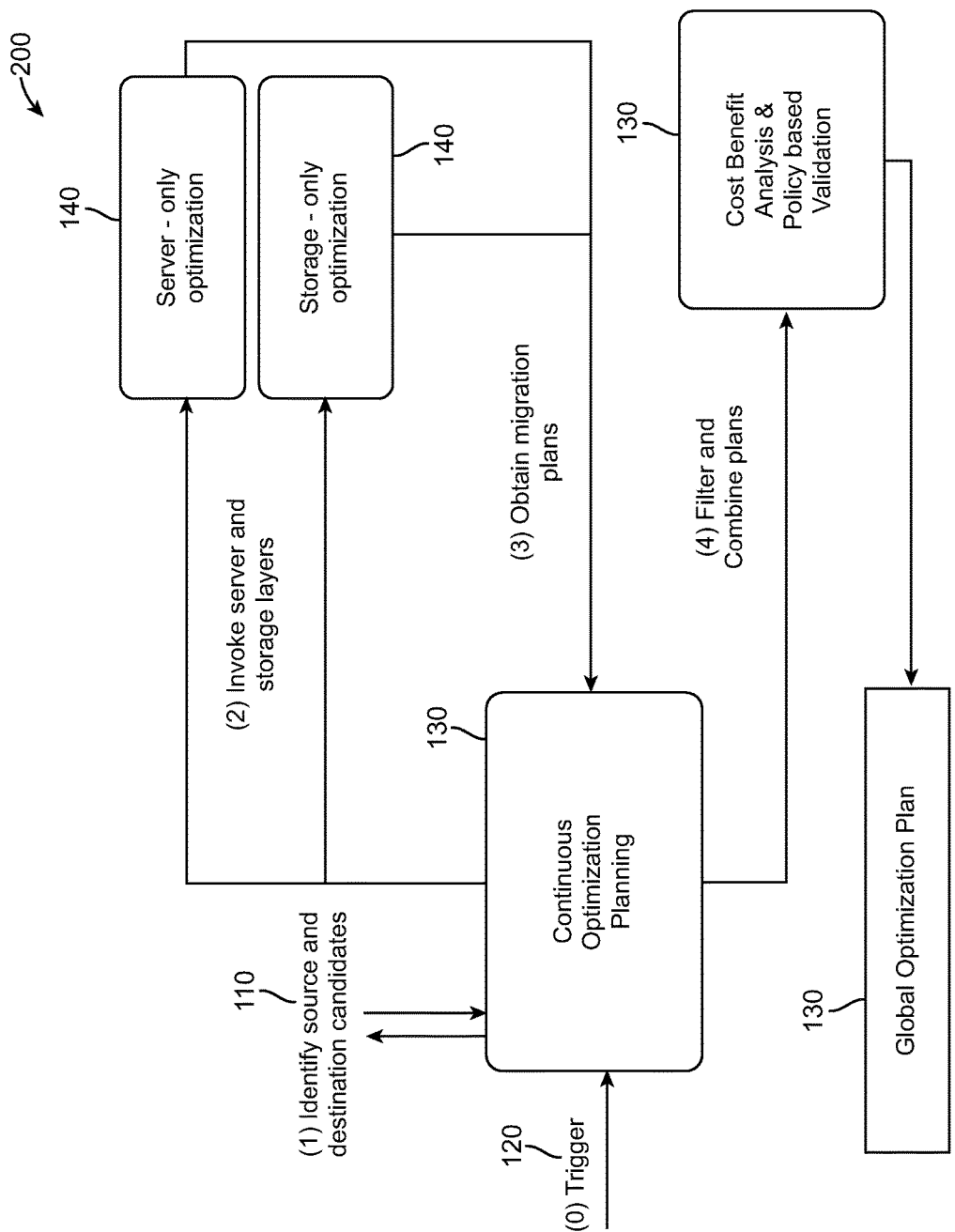
FIG. 2 illustrates a flow diagram for the process illustrated in FIG. 1, according to an embodiment of the invention.

FIG. 2 illustrates a flow diagram 200 for the process illustrated in FIG. 1 according to an embodiment of the invention. Blocks 110, 120, 130 and 140 are associated with processing that may occur in process blocks 11, 12, 13 and 14 of the combined server and storage virtualization continuous optimization process 100 as asserted in above for a clearer understanding of the flow of a combined server and storage virtualization continuous optimization process.

Figure 3:
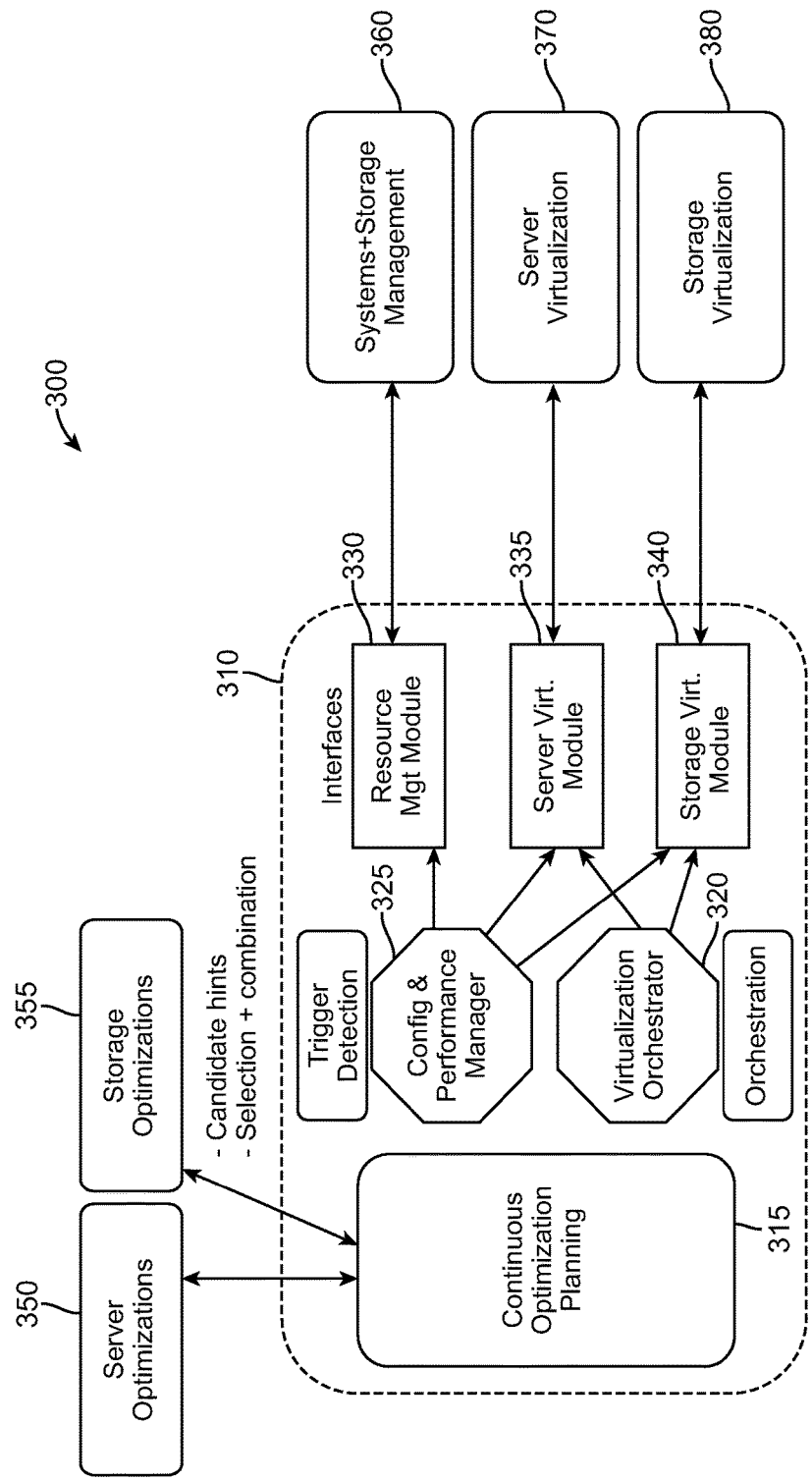
FIG. 3 illustrates a combined server and storage virtualization continuous optimization module, according to an embodiment of the invention.

FIG. 3 illustrates a combined server and storage virtualization continuous optimization module 310 in system 300 according to an embodiment of the invention. Combined server and storage virtualization continuous optimization module 310 includes continuous optimization planning module 315, virtualization orchestrator module 320, configuration and performance manager module 325, resource management module 330, server virtualization module 335 and storage virtualization module 340. Combined server and storage virtualization continuous optimization module 310 is connected to a data center (not shown).

From combined server and storage virtualization continuous optimization module 310 server optimizations 350 and storage optimizations 355 are performed on the data center. From the systems and management module 360, the combined server and storage virtualization continuous optimization module 310 receives performance statistics of the data center servers, storage and network switches. The combined server and storage virtualization continuous optimization module 310 also receives performance for server and storage virtualization components from the server virtualization module 370 and the storage virtualization module 380. Then the combined server and storage virtualization continuous optimization module 310 generates hints by identifying servers, network switches and storage systems that can be optimized and sends the hints to the server and storage optimization modules (350 and 355). Based on the chosen optimizations by server optimizations 350 and storage optimizations 355, the combined server and storage virtualization continuous optimization module 310 selects the best plans, which may also involve combining multiple plans from the individual server and storage optimization modules (350 and 355) into a single plan. From the combined server and storage virtualization continuous optimization module 310 commands for managing systems and management of the data center are transmitted to systems and storage management module 360. The orchestration of the optimizations plans are performed through the server virtualization (VM migration) module 370, storage virtualization module (storage migration) 380 and systems and storage management module 360.

From combined server and storage virtualization continuous optimization module 310, the server virtualization module 335 provides commands for server virtualization. The server virtualization module 370 provides information to the combined server and storage virtualization continuous optimization module 310 regarding (a) configuration of the server virtualization systems in the data center, e.g., configuration of physical servers, virtual machines and (b) performance statistics of each server virtualization component, e.g., CPU, memory, network I/O, disk I/O usage of physical servers and virtual machines. Also the server virtualization module 370 is used to orchestrate any virtual machine migrations once chosen as part of an optimization plan by the combined server and storage virtualization continuous optimization module 310.

From combined server and storage virtualization continuous optimization module 310, the storage virtualization module 340 provides commands for storage virtualization. The storage virtualization module 380 provides information to the combined server and storage virtualization continuous optimization module 310 regarding the configuration of storage virtualization in the data center, e.g., how many virtual disks are being used, which virtual storage pools exist and the mapping between virtual disks and back end physical storage volumes. Additionally, in one embodiment of the invention the storage virtualization module 380 is used to orchestrate any migration of storage volumes as part of the optimization plan generated by the combined server and storage virtualization continuous optimization module 310.

The configuration and performance manager module 325 provides trigger detection of the different overload conditions in the data center. The virtualization orchestrator module 320 provides orchestration of different continuous optimizations including migration commands.

Figure 4:
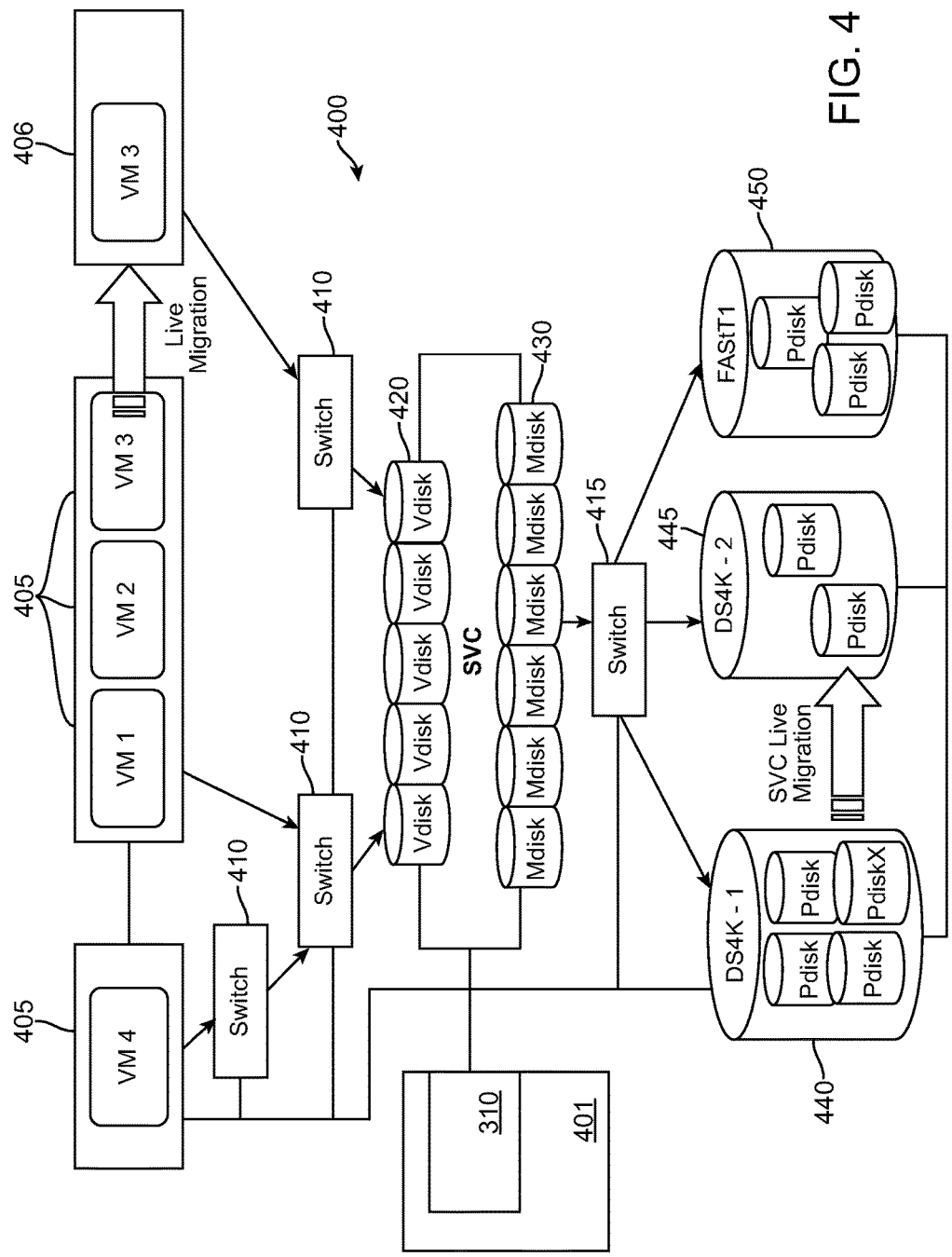
FIG. 4 illustrates a data center system for combined server and storage virtualization continuous optimization of one embodiment of the invention.

FIG. 4 illustrates a data center 400 including a combined server and storage virtualization continuous optimization module 310 according to one embodiment of the invention. In one embodiment of the invention, data center 400 includes virtual machines 405 and 406, virtual storage disks 420, Mdisks 430, virtual device switches 410, physical storage device switch 415, physical storage devices 440, 445 and 450, and physical server 401. In one embodiment of the invention, the combined server and storage virtualization continuous optimization module 310 is included in physical server 401. In other embodiments of the invention, the combined server and storage virtualization continuous optimization module 310 can be placed anywhere within or externally connected to the data center 400.

From the combined server and storage virtualization continuous optimization module 310, hints from the different physical and virtual devices in the data center 400 provide hints for continuous optimization. The combined server and storage virtualization continuous optimization module 310 provides commands for allocation migration to reduce overloading conditions within the data center 400. As previously mentioned, the combined server and storage virtualization continuous optimization module 310 provides the capabilities of process 100.

Figure 5:
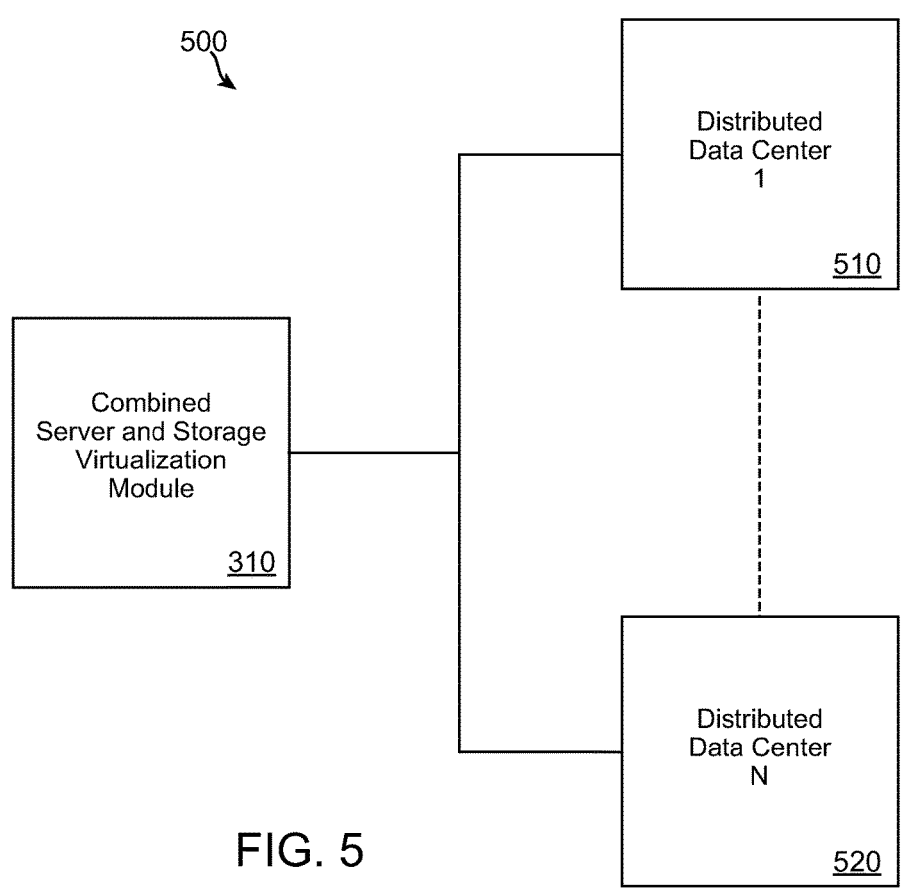
FIG. 5 illustrates a distributed network including a combined server and storage virtualization continuous optimization module, according to an embodiment of the invention.

FIG. 5 illustrates a system 500 according to an embodiment of the invention with the combined server and storage virtualization continuous optimization module 310 coupled to distributed data center 1 510 to distributed data center N 520, where N is a positive integer. In this embodiment of the invention, the combined server and storage virtualization continuous optimization module 310 provides continuous optimization in distributed data center 1 510 through distributed data center N 520 over a network, such as a Local Area Network (LAN), Wide Area Network (WAN), Internet, etc. The distributed data center 1 510 through N 520 communicate over the network either wirelessly or wired directly to the network. In one embodiment, only selected distributed data centers are continuously optimized.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for continuous optimization of a data center, the method comprising:

monitoring loads of storage modules, server modules, and switch modules in the data center, wherein the storage modules include physical storage devices and virtual storage devices, the server modules include physical server devices and virtual server devices, and the switch modules include physical switch devices and virtual switch devices;

detecting an overload condition in the data center upon a load exceeding a load threshold for storage module overloads, server module overloads, and switch module overloads;

combining continuous server and storage virtualization in the data center by:

generating a first set of allocation migration plans for allocation migration between the storage modules for addressing storage device overloads, wherein each allocation migration plan of the first set comprises a migration of a storage volume to a storage module, and the first set is obtained from a storage optimization layer of the data center;

generating a second set of allocation migration plans for allocation migration between the server modules for addressing server device overloads, wherein each allocation migration plan of the second set comprises a migration of a virtual machine to a server module, and the second set is obtained from a server optimization layer of the data center; and selecting, based on the overload condition and a cost-benefit analysis, one or more allocation migration plans from at least one of the first and second sets of allocation migration plans; and orchestrating a combination of the selected allocation migration plans for reducing the overload condition based on a recommendation from each layer of the data center;

wherein the continuous optimization further comprises invoking the storage optimization layer to balance storage loads between the storage modules in response to a storage overload or a switch device overload;

wherein the continuous optimization further comprises invoking the server optimization layer to balance server loads between the server modules in response to a server overload or a switch device overload;

wherein the storage virtualization comprises mapping between virtual disks and physical storage volumes;

wherein, if the overload condition comprises a server overload or a storage overload, the selecting comprises filtering out, from the first and second sets of allocation migration plans, each allocation migration plan that contributes to a switch device overload, and selecting one or more remaining highest ranked allocation migration plans; and wherein, if the overload condition comprises a switch device overload, the combination comprises identifying one or more virtual machines performing input/output (I/O) through a switch device that triggered the switch device overload, identifying one or more server modules not performing I/O through the switch device that triggered the switch device overload, and migrating the one or more virtual machines identified to the one or more server modules identified such that sum of loads removed by the migration exceeds an overload amount on the switch device that triggered the switch device overload.

2. The method of claim 1, wherein:

if the overload condition comprises a switch device overload, the combination further comprises migrating one or more storage volumes to one or more storage modules.

3. The method of claim 2, wherein the continuous optimization further comprises continuously generating hints based on a combination of switch device overload, physical server device overload, and physical storage device overload.

4. The method of claim 2, wherein the detecting further comprises:

obtaining physical server and storage device management data;

obtaining virtual server and storage device management data; and correlating the physical server and storage device management data and the virtual server and storage device management data to determine overall load conditions.

5. The method of claim 2, wherein the combining continuous server and storage virtualization further comprises:

continuously creating a plurality of possible allocation migration plans for allocation migration between storage modules, server modules and for addressing switch device overloads; and selecting at least one allocation migration plan based on load reduction.

6. The method of claim 5, wherein the selecting further comprises:

filtering the first and second sets of allocation migration plans based on a predetermined policy; and combining allocation migration plans for allocation migration between storage modules, server modules and for addressing switch device overloads to maximize load reduction.

7. The method of claim 6, wherein the filtering further comprises:
eliminating allocation migration plans that would cause physical and virtual server switch and physical and virtual storage switch overloads.

8. The method of claim 2, further comprising:
if the overload condition comprises the switch device overload:
invoking the server optimization layer to migrate server loads from the one or more virtual machines identified to the one or more server modules identified.

9. The method of claim 2, wherein:
if the overload condition comprises a switch device overload, the combination results in a greatest load reduction to shift a load away from an overloaded switch device.

10. The method of claim 1, wherein the orchestration is executed in a non-disruptive manner while applications continue to execute in the data center, wherein orchestration comprises different continuous optimizations including migration commands.

11. A data center system comprising:
a plurality of server modules including a plurality of virtual machines;
a plurality of storage modules including a plurality of virtual storage modules;
a plurality of server module switches that switch connections to the plurality of storage modules and virtual storage modules, wherein the plurality of storage modules include a plurality of physical storage devices and virtual storage devices, the plurality of server modules include a plurality of physical server devices and virtual server devices, and the plurality of server module switches include a plurality of physical server module switches and virtual server module switches;
a monitor that continuously monitors system loads of the plurality of server modules, the plurality of virtual server modules, the plurality of storage modules, the plurality of virtual storage modules, and the plurality of server module switches;
a detector that detects an overload condition in the data center system upon a system load exceeding a load threshold for storage module overloads, server module overloads, and switch module overloads, wherein the system load comprises loads on individual server devices, storage devices and switch devices;
a planner that:
generates a first set of allocation migration plans for allocation migration between the storage modules for addressing storage device overloads, wherein each allocation migration plan of the first set comprises a migration of a storage volume to a storage module, and the first set is obtained from a storage optimization layer of the data center system;
generates a second set of allocation migration plans for allocation migration between the server modules for addressing server device overloads, wherein each allocation migration plan of the second set comprises a migration of a virtual machine to a server module, and the second set is obtained from a server optimization layer of the data center system; and
selects, based on the overload condition and a cost-benefit analysis, one or more allocation oration plans from at least one of the first and second sets of allocation migration plans; and
a virtualization orchestrator configured to orchestrate based on a recommendation from each layer in the data center system;
wherein the continuous optimization further comprises invoking the storage optimization layer to balance storage loads between the storage modules in response to a storage overload or a switch device overload;
wherein the continuous optimization further comprises invoking the server optimization layer to balance server loads between the server modules in response to a server overload or a switch device overload;
wherein; if the overload condition comprises a server overload or a storage overload, the selecting comprises filtering out, from the first and second sets of allocation migration plans, each allocation migration plan that contributes to a switch device overload, and selecting one or more remaining highest ranked allocation migration plans; and
wherein, if the overload condition comprises a switch device overload, the combination comprises identifying one or more virtual machines performing input/output (I/O) through a switch device that triggered the switch device overload, identifying one or more server modules not performing I/O through the switch device that triggered the switch device overload, and migrating the one or more virtual machines identified to the one or more server modules identified such that sum of loads removed by the migration exceeds an overload amount on the switch device that triggered the switch device overload.

12. The system of claim 11, further comprising:
a resource manager that manages the plurality of server modules and the plurality of storage modules;
a server virtualizer that manages the plurality of virtual machines; and
a storage virtualizer that manages the plurality of virtual storage modules, wherein storage virtualization comprises mapping between virtual disks and physical storage volumes,
wherein the planner is further configured to generate hints for each physical layer of the data center system based on switch overload, physical server device overload, and physical storage device overload.

13. The system of claim 12, wherein upon a switch module being loaded beyond a switch load threshold, the server virtualizer and the storage virtualizer select a source server node for coupling with the switch module and select destination nodes for lowering a load on the switch module below the switch load threshold, and the virtualization orchestrator allocates migration between storage modules, server modules and for addressing switch device overloads.

14. The system of claim 11, wherein the monitor:
obtains server module and storage module management data;
obtains virtual server module and virtual storage module management data; and
correlates the server module and storage device management data and the virtual server module and virtual storage module management data for determining overall system load conditions.

15. A computer program product for managing system loads in a data center comprising a non-transitory computer usable medium including a computer readable program, wherein the computer readable program when executed on a computer causes the computer to:

continuously monitor loads of storage modules, server modules, and switch modules in the data center, wherein the storage modules include physical storage devices and virtual storage devices, the server modules include physical server devices and virtual server devices, and the switch modules include physical switch module devices and virtual switch module devices;

detect an overload condition in the data center upon a load exceeding a load threshold for storage module overloads, server module overloads, and switch module overloads;

combine server and storage virtualization in the data center for addressing storage device overloads by:

generating a first set of allocation migration plans for allocation migration between the storage modules for addressing storage device overloads, wherein each allocation migration plan of the first set comprises a migration of a storage volume to a storage module, and the first s obtained from a storage optimization layer of the data center;

generating a second set of allocation migration plans for allocation migration between the server modules for addressing server device overloads, wherein each allocation migration plan of the second set comprises a migration of a virtual machine to a server module, and the second set is obtained from a server optimization layer of the data center; and selecting, based on the overload condition and a cost-benefit analysis, one or more allocation migration plans from at least one of the first and second sets of allocation migration plans; and orchestrate a combination of the selected allocation migration plans for reducing the overload condition based on a recommendation from each layer of the data center;

wherein the continuous optimization further comprises invoking the storage optimization layer to balance storage loads between the storage modules in response to a storage overload or a switch device overload;

wherein the continuous optimization further comprises invoking the server optimization layer to balance server loads between the server modules in response to a server overload or a switch device overload;

wherein; if the overload condition comprises a server overload or a storage overload, the selecting comprises filtering out, from the first and second sets of allocation migration plans, each allocation migration plan that contributes to a switch device overload, and selecting one or more remaining highest ranked allocation migration plans; and wherein, if the overload condition comprises a switch device overload, the combination comprises identifying one or more virtual machines performing input/output (I/O) through a switch device that triggered the switch device overload, identifying one or more server modules not performing I/O through the switch device that triggered the switch device overload, and migrating the one or more virtual machines identified to the one or more server modules identified such that sum of loads removed by the migration exceeds an overload amount on the switch device that triggered the switch device overload.

16. The computer program product of claim 15, wherein:

if the overload condition comprises a switch device overload, the combination further comprises migrating one or more storage volumes to one or more storage modules.

17. The computer program product of claim 15, wherein the detect an overload further causing the computer to:

obtain individual physical server and storage device management data;

obtain virtual server and storage device management data; and correlate the physical server and storage device management data and the virtual server and storage device management data to determine overall load conditions.

18. The computer program product of claim 15, wherein the combine server and storage virtualization further causes the computer to:

continuously create a plurality of possible allocation migration plans; and select at least one allocation migration plan based on load reduction, wherein said select further causing the computer to:

filter the first and second sets of allocation migration plans based on a predetermined policy; and combine allocation migration plans to maximize load reduction;

wherein the continuous optimization comprises continuously generating hints based on switch overload, physical server device overload, and physical storage device overload.

19. The computer program product of claim 15, wherein:

if the overload condition comprises a switch device overload, the combination results in a greatest load reduction to shift a load away from an overloaded switch device.

20. The computer program product of claim 15, wherein orchestrate the planned allocation migration executes in a non-disruptive manner while applications continue to execute in the data center, wherein orchestration comprises different continuous optimizations including migration commands.

* * * * *